May 3, 1955

W. E. DEMPSEY 2,707,554

GRAIN SEPARATORS

Filed Aug. 16, 1951

INVENTOR:
WALTER E. DEMPSEY

BY Featherstonhaugh & Kent

His Atty's

May 3, 1955  W. E. DEMPSEY  2,707,554
GRAIN SEPARATORS
Filed Aug. 16, 1951  4 Sheets-Sheet 4
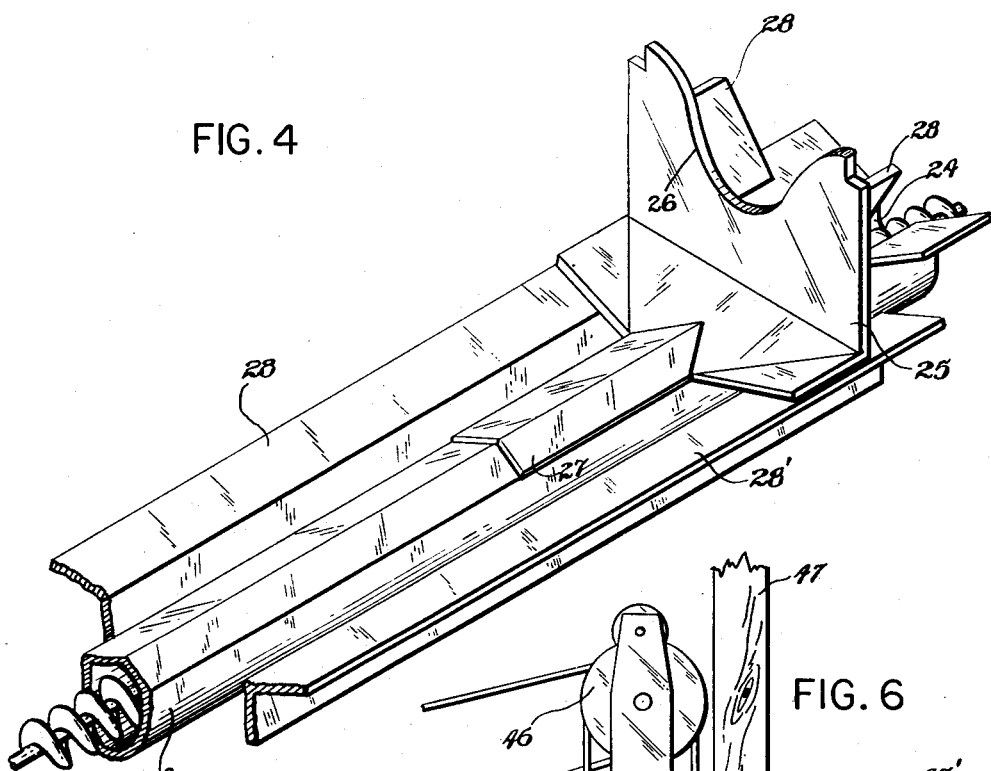
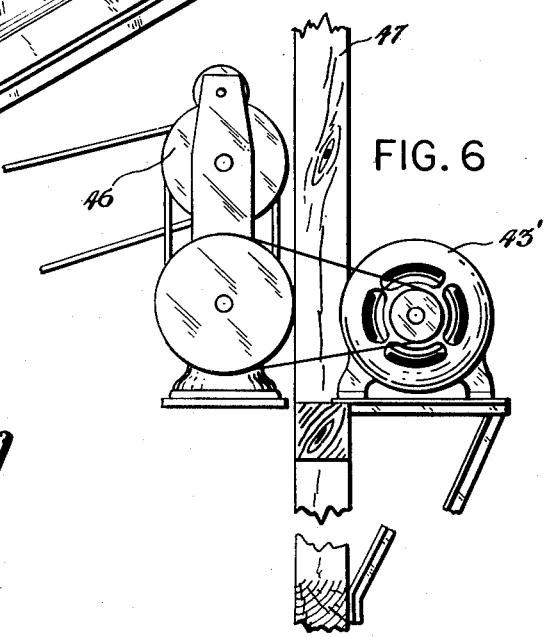
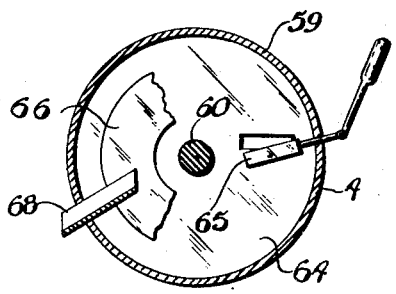
INVENTOR:
WALTER E. DEMPSEY
BY Featherstonhaugh & Kent
His Atty's

United States Patent Office 2,707,554
Patented May 3, 1955

2,707,554

GRAIN SEPARATORS

Walter E. Dempsey, Moose Jaw, Saskatchewan, Canada

Application August 16, 1951, Serial No. 242,049

1 Claim. (Cl. 209—12)

My invention relates to improvements in grain separators and originates from my recognition that most cereal grains (wheat, oats barley, rye, etc.), after threshing, have mixed with them a percentage of weed seeds and, sometimes, a certain percentage of other cereal grains. Such mixtures are well known to be undesirable, and various devices have long been used to make certain separations of such commingled stock.

The present invention accordingly results from a recognition of the following facts:

That, to date, no single-unit grain separator has been made, to the best of my knowledge and belief, that will make, in one run-through, a reasonably pure segregation of all cereal grains and the weed seeds that are commonly found to be mixed therewith.

That, to make reasonably pure segregation of cereal grains and weed seeds in one run-through of a mechanical grain-separation unit, there has to be employed, in addition to other novel features, (1) a width separation that is variable, (2) an air separation that is variable and (3) a length separation that is variable, such variability in each case, covering the range required for the efficient separation of the cereal grains and weed seeds.

That, to date, no single-unit grain separator has been made that provides a width separation that is variable, an air separation that is variable and a length separation that is variable, to the best of my knowledge and belief.

In the light of the foregoing, the objects of the present invention may therefore be summarized as follows:

First, to employ a variable width-separation in the form of one or more cylindrical screens with circumferential-longitudinal openings which are adjustably variable to allow for the division of a mixture of cereal grains and/or weed seeds into two fractions by means of a transverse-diameter division in order to segregate undersized grains and small weed seeds from normal grains and larger weed seeds; second, to employ a variable air-separation in the form of an air-separator having manually controlled speed and volume to separate from the principal cereal grain in the transverse-diameter division containing the normal grains (overs), the weed seeds (particularly wild oats) and/or admixtures of other grains which are lighter in weight than the aforementioned principal cereal grain; third, to employ a variable length-separation in the form of a pocketed-disc separator wherein the discs are arranged in series in which the pockets of each series of discs are larger in size than those in the antecedent series, in the direction of travel of the grain through the said disc-separator, and a companion conveyor system to the series of discs working on the "overs" to allow for the reunion with the main tail-over division in the disc-separator of any grains which have been picked up by the discs and which are under normal size in longitudinal diameter (as compared with the bulk of the grains in the main tail-over-division) but desirable for reunion with the main tail-over-division; fourth, to return longitudinally-short "thrus," which, because of volume, have escaped isolation from the other fractions in that part of my length dividing assembly which initially receives the "thrus" and lighter-weight "overs" and passed into that section of my length dividing assembly which is available to handle the heavier "overs," back into the first part or section for further isolating treatment; fifth, to effect up to three fractional separations in the part of my length dividing assembly which receives the heavier "overs"; and sixth, to combine the first three features in novel arrangement to produce a grain separator of the kind hereinafter described.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

Figure 4 is an enlarged perspective fragmentary view of the inlet end of the "overs" collecting auger.

Figure 5 is an enlarged fragmentary end elevation of the partition between the two sections of my length dividing assembly.

Figure 6 is a fragmentary side elevation showing the source of power.

In the drawings like characters of reference indicate corresponding parts in the different figures.

Figure 1:
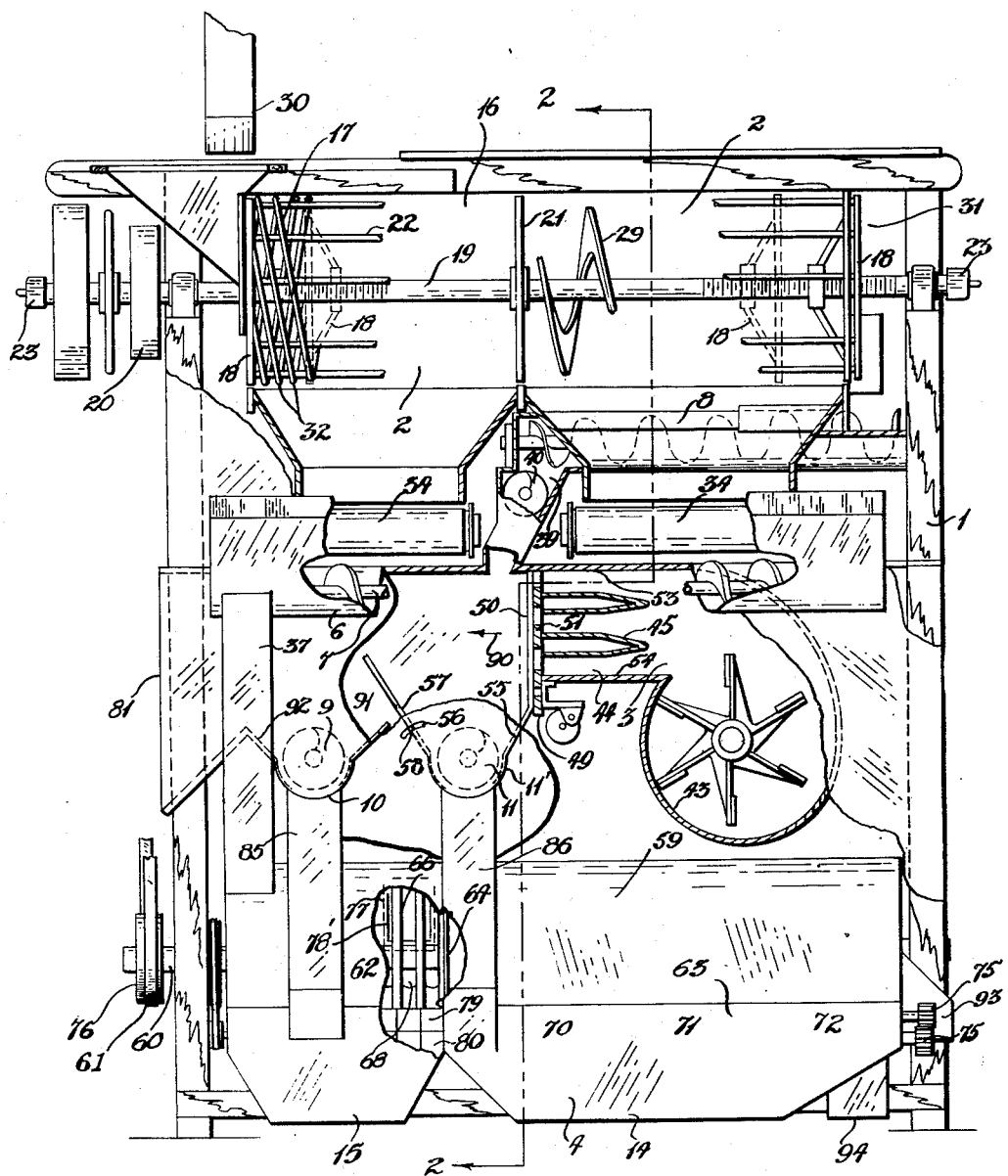
Figure 1 is an elevation of my grain separator from one side thereof but with considerable structure shown in sectional form or fragmented form, substantially along the lines 1—1 of Figure 2.

My grain separator is contained within a substantially rectangular housing 1. The main components consist of a transverse diameter dividing assembly collectively designated 2, a weight-dividing assembly collectively designated 3, and a length-dividing assembly collectively designated 4, in the ascending order above set forth.

Interposed between the transverse diameter dividing assembly 2 and the assembly 3 is a pair of horizontally disposed belts designated 5 intended to convey fractions from the assembly 2 to the conveying trough and auger 6 and 7 respectively. Interposed between the belts 5 and the assembly 2 are horizontally disposed conveyors 8 intended to transmit certain other fractions from the transverse diameter dividing assembly 2. Occupying a horizontal stratum of space below the horizontally produced upper and lower boundaries of the assembly 3 are conveying troughs and augers 9 and 10, and 11 and 11' respectively. Alongside the assembly 4 but spaced therefrom by the width of the grain channels 12 and 13 are discharge chutes 14 and 15.

Proceeding to describe my transverse diameter dividing assembly 2 in detail, the same comprises one or more horizontally disposed and open-ended cylinders 16 formed of one or more continuously spiralled strands of wire 17. At each end of said cylinder, a spider 18 is screw-threadably secured to the central drive shaft 19 operated by a source of power via the pulley 20. Medially along shaft 19 is a centrally disposed spider 21 rigidly secured to the drive shaft. The wires 17 are anchored to the spiders 18 and to the fixed spider 21. Extending between the end of spiders 18 is an annularly arranged set of rigid spaced stiffening and guide rods 22. The extremities of the shaft 19 are provided with operating cranks 23 for moving the end of spiders 18 inwardly or away from the fixed spider 21 due to the screw-threadable engagement of said spiders to shaft 19.

Within the cylinder 16 is a compressibly yieldable auger-band 29 to urge a mass of grain and weed seeds introduced thereinto via the intake duct 30, rightwardly towards the discharge end 31. From the foregoing it is to be understood that the cylinders 16 may be varied as to their grain-passing tolerance by rotation of the shaft 19 which will have the effect of moving the spiders 18 towards or away from the fixed spider 21 upon the rods 22 (which traverse the rims of the spiders 18 and 21). In other words, the cylinders may be horizontally contracted or expanded accordionwise so as to vary the proximity of each pair of adjacent "rounds" of wire 32.

Figure 2:
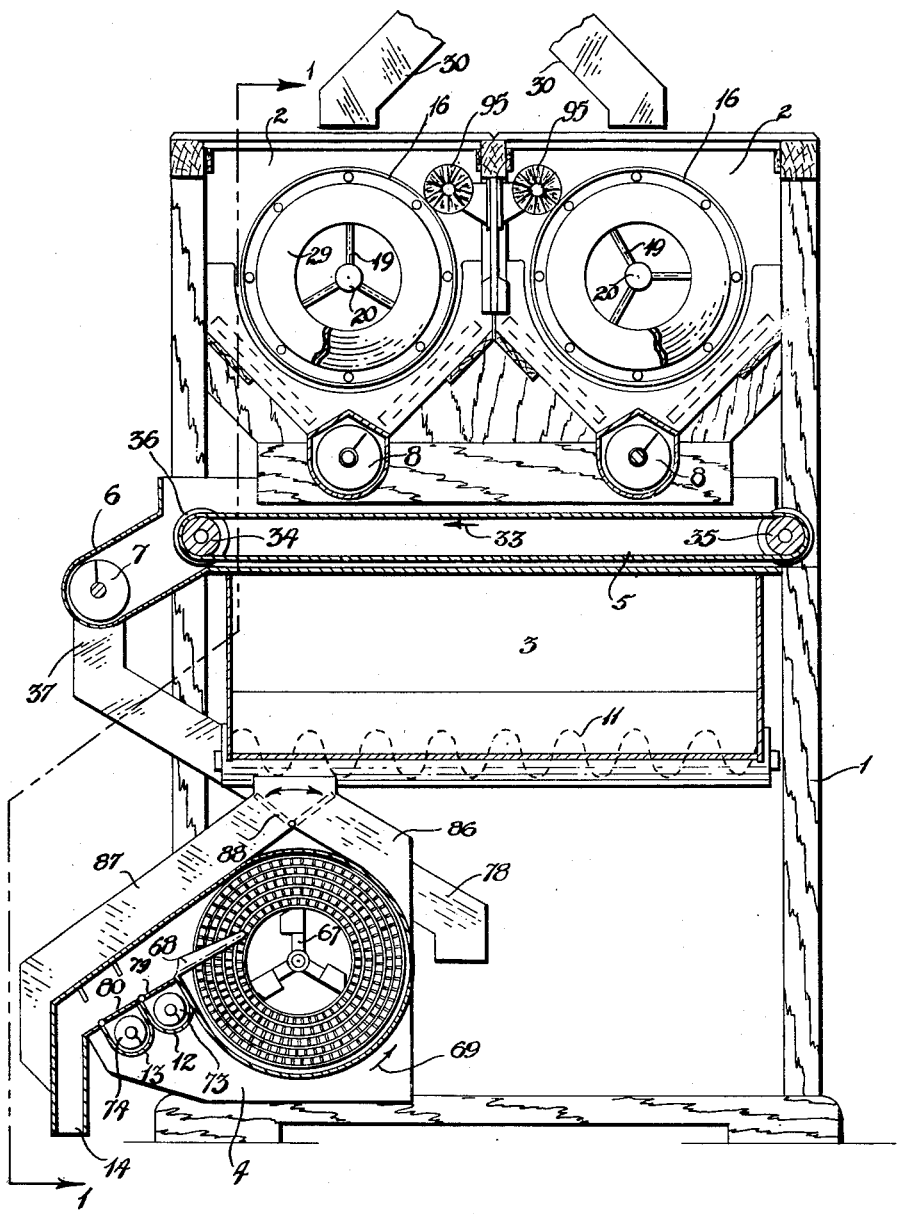
Figure 2 is a sectional elevation on the line 2—2 of Figure 1.
Figure 3:
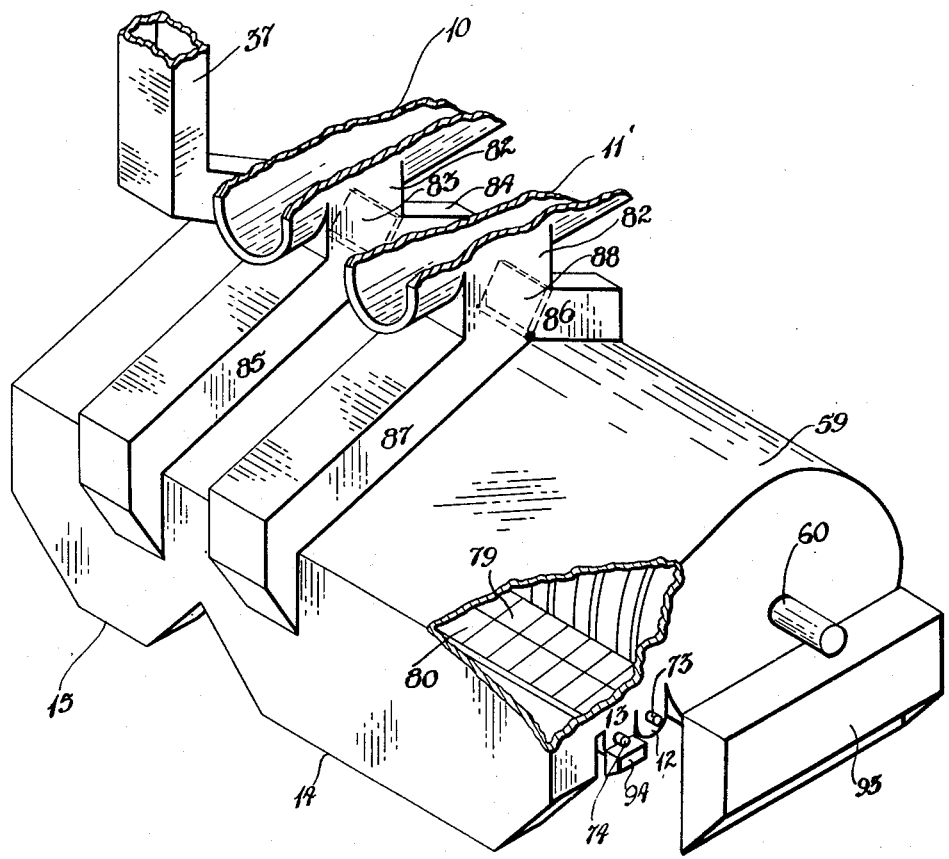
Figure 3 is a perspective representation of my length dividing assembly.

The grains and weed seeds of smaller transverse diameter will thus pass through the "rounds" of wire forming my cylinders 16, and such grains and weed seeds I collectively designate "thrus." These fall upon the belt 5 aforesaid, the belt travelling in the direction indicated by arrow 33 in the accompanying Figure 2 under the influence of the rollers 34 and 35. The grain is thus precipitated from the discharge end 36 of the belt 5 into the conveying trough 6 already referred to, and is conveyed therealong by auger 7 leftwardly (with respect to the accompanying Figure 1) to the trunk 37.

The fraction of grains and weed seeds which are of too great a transverse diameter to pass between the "rounds" of wire forming my screens 16, are eventually urged by the auger 29 out through the discharge end 31 of the cylinders 16 to be precipitated into conveyors 8 already so designated. It will be apparent that the material spilled through the discharge end 31, and which I designate as "overs," will be precipitated into conveyors 8 and thence into hopper 39 from which it will pass to weight-dividing assembly 3 by the influence of feed roller 40 in hopper 39.

In connection with the discharge of the "overs" from the cylinder 16, it will be appreciated that I have to provide means to channel these "overs" into the augers 8 and avoid precipitation on to the belt 5, particularly in view of the fact that the overall length of the cylinder is adjustable between limits as illustrated by the representation of the spiders 18 in phantom in Figure 1. The detail of this means is shown in Figure 4 of the accompanying drawings which shows the auger 8 having an inlet end 24 and a sliding partition 25 being formed as illustrated with a cut-out 26 which embraces the underside of the cylinder 16. This partition is slideable with the ends of the cylinder 16 so that the "overs" are always deposited within the open end 24 of the auger 8. In this connection I have also provided a ridge cover 27 which slides along the top of the auger casing and covers the portion of the opening 24 which lies behind the partition 25. I have also provided guide panels 28 secured to the partition 25 which also assists in funnelling the "overs" into the opening 24. The longitudinally extending side angles 28' deflect or guide the "thrus" past the auger casing 8 and on to the belt 5.

My weight-dividing assembly collectively designated 3 is in the form of an air winnower, and comprises a blower-housing 43 out of which grows a horizontally extending, and comparatively narrow air-blast nozzle 44 provided with a plurality of equi-spaced air-current deturbulizing louvres 45. Associated with the conventional motor 43' or other form of drive, which operates the conventional fan within housing 43 is a control 46 or its electrical equivalent, mounted upon side wall 47 whereby the speed may be controlled and varied so as to adjust the air current velocity through nozzle 44. To vary the volume of air emerging through nozzle 44 I provide the horizontally slotted intercepting plate 49 vertically movable against the nozzle exit-edge within the guides 50. The lands or intercepting strips 51 between the slots 52 are of a width equal to the space between the louvres 45 or between the louvres and the upper and lower horizontal walls 53 and 54 of nozzle 44. Hence, it will be obvious that by vertical adjustment of the intercepting panel 49, I am able partially to occlude the area of air discharge from my winnower, and hence the volume thereof.

Below my weight dividing assembly 3 are positioned the aforesaid conveying troughs 10 and 11' of which the former is designed to receive the lighter-weight "overs," and the latter, the heavier-weight "overs" as will be hereinafter more fully described.

Extending between one edge of trough 11' and the lower discharge edge of nozzle 44 is a barrier-board 55. Hingedly secured to the other edge of trough 11' for rotation through the arc represented by the slot 56 is an adjustable baffle-board 57 controllable by the handle-bar 58.

My length dividing assembly collectively enumerated 4 comprises a horizontally disposed, elongated cylindrical housing 59 having a centre-shaft 60 extending clear therethrough and rotatable by means of a pulley and belt 61 or other suitable driving mechanism. The cylinder 59 is divided into two main sections 62 and 63, these sections being separated by the vertically disposed apertured wall 64, the aperture being, however, closable by means of a tail-over gate 65 clearly depicted in the accompanying Figure 5.

Within the section 62 is a set of conventional, grain separating, pocketed discs 66 secured to shaft 69 by flattened and skewed spokes 67 which function as augers for the conveyance of a mass of grain rightwardly (with respect to the accompanying Figure 1) through the sections. Between each of the discs is an inclined grain trough 68, and it is to be understood that as the discs rotate counter-clockwise as indicated by arrow 69 in the accompanying Figure 2, grains and weed seeds short enough to nest in the undercut pockets will be carried around to be precipitated into the troughs 68. At this point it is to be noted that the pockets of the set of discs in section 62 are small so as to pick up only small weed seeds which have reached section 62 via the "thrus" conveying trunk 37.

In section 63 of cylinder 59 are three sets of pocketed discs, and each of these sets 1 consider as occupying the sub-sections 70, 71 and 72 of section 63. However, these sub-sections are not physically separated as are the main sections 62 and 63, but the pockets of each succeeding set of discs progressing rightwardly (with respect to the accompanying Figure 1) are in ascending order of magnitude so as to pick up increasingly longer grains. Between each of the discs in section 63 inclining chutes 68 are also located, and it is to be understood that the right-hand end (referring to Figure 1) of cylinder 59 is equipped with an adjustable opening from whence grain not picked up by the discs may be conveyed to a distant point.

Extending alongside my length dividing assembly, or in other words, contiguous to the low exit ends of the line-up of troughs 68 are the aforesaid grain channels 12 and 13, the latter occupying a slightly inferior stratum of space as clearly indicated in Figure 2. Within these channels are oppositely rotatable augers 73 and 74, auger 73 conveying fractions leftwardly with respect to Figure 1, auger 74 conveying fractions rightwardly to a discharge point at the end thereof. Such opposite rotation is effected by the gears 75 keyed to the auger shafts, and rotation of these components may be initiated as for example by means of a belt and pulley 76 keyed to one or other of the shafts of the augers 73 or 74. At this point it should also be mentioned that the left end (with respect to Figure 1) of grain channel 12 is elbowed so as to communicate with the left-end interior of section 62, and that upon the wall of cylinder 59 in the locus of the right end of section 62, a discharge aperture 77 is provided, the same communicating with a discharge duct 78. Aperture 77 is suitably valved as by means of the sliding panel 78 curved to the contour of cylinder 59 and operable from the outside whereby discharge may be cut off from duct 78.

Overlying the grain channels 12 and 13 are twin lineups of hinged trapdoors 79 and 80, the two lineups when closed being inclined and co-planar so as to provide a smooth chuting surface over which grain being precipitated by chutes 68 may slide into the aforesaid discharge chutes 14 and 15 also ranged alongside my length dividing assembly closely adjacent the hinges of the trapdoor lineup 80. It will, however, be clearly apparent from Figure 2 that since the aforesaid trapdoors are hinged at the inferior ends thereof, they will, when opened, operate to permit grain from the chutes 68 to gravitate into whichever of the grain channels lies therebeneath.

In conclusion, and prior to a detailed description of the operation of my separator, I advert for reference purposes to the air stream discharge flue 81 through which chaff is blown in connection with the winnowing operation, also to the Y ducting from the discharge end of trough 10 and into the head-end 82 of which the "thrus" are precipitated to be directed according to the position of the two-way valve 83 either into leg 84 and from thence into section 62, or through leg 85 to a suitable collecting point. Reference is also made to duct 86 which leads into the disc separating main section 63 from the discharge end of trough 11', and to the by-pass trunk 87 leading from trough 11 to discharge chute 14, and to the two-way valve 88 at the conjunction of the members 86 and 87 whereby the direction of the heavy "overs" may be determined.

Proceeding now to describe the operation of my grain separator, the following will be found helpful.

As I have already stated, the "thrus" pass through the screen of cylinder 16 to be precipitated on to belt 5, from thence into trough 6, downwardly through trunk 37 into the left end of section 62. The "overs" tail over the discharge ends of the cylinders 16 to be precipitated into conveyors 8 by which they are conveyed to hopper 39 from whence they are fed to the winnower 3.

From the hopper 39, the entire mass of "overs" tumble past the nozzle 44 of the assembly 3, and during such passage are subjected to the effect of the air stream emerging from the nozzle and travelling in the direction indicated by arrow 90.

This will have the effect of separating the light-weight "overs" from the heavy-weight "overs," the former being blown into auger 9 from thence to be conveyed downwardly either through leg 84 into the left end of section 62 or through leg 85 into a receiving point according to the setting of valve 83.

Simultaneously the heavy "overs" are precipitated into trough 11' and are from thence conducted either through trunk 86 to the left end of section 63, or else through the by-pass trunk 87 to the discharge chute 14. At this point attention should be directed to the purpose of the adjustable baffle board 57, which is to intercept the lighter but desirable "overs" which move away from the heaviest "overs" in the winnowing process. It will also be noted that I provide wall portions 91 and 92 springing inclinable upwards and divergently from the edges of trough 9 to prevent scattering of the light-weight "overs."

Within the main section 62 of my length dividing assembly 4 the light weight "overs" may be commingled with the "thrus." However, the effect of the small pockets of the discs within this main section is such as to pick up only the longitudinally short fraction for discharge through chute 15. Then, if the aperture 65 is closed and aperture 77 is opened, all the remaining values will exit through duct 78. It should be pointed out that aperture 77 will be used almost exclusively as an exit for thin oats and wild oats that are diametrically narrower than normal oats and barley that are being processed.

If, however, aperture 65 is open and aperture 77 is closed, then the remaining values will be discharged into the left end of main section 63 (the division which passed through aperture 65 will commingle with any "overs" entering section 63 via duct 86), and any small weed seeds which escaped isolation in section 62 will be picked up by sub-section 70 and returned to section 62 via conveyor 73 if trapdoors 79 of channel 12, which are in line with sub-section 70, are left open, while the remaining part of the division is handled by the discs in sub-sections 71 and 72 in a manner hereinafter described.

When the main section 63 is handling "overs" or "thrus," either commingled or separately, if the trapdoors covering the section of trough 12 which are opposite sub-section 70 be closed and the corresponding traps of channel 13 be opened, pick-up will be conveyed by auger 74 rightwardly through channel 13 to the exit-end 94 thereof, commingling with the fraction picked up in sub-sections 71 and 72. If the trapdoors of channel 13 opposite section 63 be closed as well as the corresponding trapdoors of channel 12, then the pick-up will exit into the discharge chute 14.

The pockets of the set of discs in sub-section 71 being somewhat larger than those of the set in sub-section 70, will pick up the longitudinally-larger "overs," and if it is desired that they be precipitated into discharge chute 14, the trapdoors of channels 12 and 13 opposite sub-section 71 will be closed for this purpose.

If, however, it is desired that they should be precipitated into channel 13 for delivery through exit 94, the trapdoors of this channel and opposite to sub-sections 71 will be open, and in that case, the disc pick-up from sub-section 71 will commingle with that being picked up and precipitated into channel 13 by the somewhat larger pockets of the set of discs in sub-section 72.

From all the foregoing it will be apparent that I have provided three different exits, according to the type of separation made, of material from main section 63 which was picked up by the discs therein, in addition to the exit 93 at the right-hand end of the cylinder 59 and through which a division of the "overs" emerge since its components are too long to be picked up by any of the pockets of the several sets of discs. In most cases, the material delivered through exits 93 and 94 will be commingled thus permitting the accomplishment of a variable-length separation in the disc separator.

In conclusion, I would revert to my transverse-diameter-separating assembly 2 and in particular to Figure 2 of the drawings in which I have illustrated a pair of longitudinally extending, cylindrical brushes 95 which are adapted to bear against the wires of the cylinders as they are revolving thereby cleaning any grain or weed seed therefrom during operation. In the accompanying drawings, the majority of drive belts and connections have been deleted for clarity and as these connections are conventional it is not thought necessary to describe them.

Since many modifications can be made in the invention herein described, and since the accompanying drawings have been prepared only to illustrate the relative arrangement and interaction of parts, and not with regard to accuracy of dimensions for manufacturing purposes, which in view of this disclosure I consider to entail merely mechanical skill together with the skill of the mechanical draftsman, and since many apparently widely different embodiments of this invention may be made within the spirit and scope of the accompanying claim without departing from such spirit and scope, it is intended that all matter contained in the accompanying specification shall be interpreted as illustrative only and not in a limiting sense, and I desire only such limitations placed thereon as justice dictates.

What I claim as my invention is:

In the art of grain separation, and in combination, a variable transverse-diameter-dividing assembly, a weight-dividing assembly, and a selective-length-dividing assembly, all to operate upon a given mass of grain and weed seeds in the order descending above set forth, said transverse-diameter-dividing assembly isolating the screen-passing grain and weed seeds or thrus from the non-screen-passing grain and weed seeds or overs, said weight-dividing assembly isolating the heavy weight overs from the light weight overs, said length-dividing assembly being formed of two main sections, one of which is designed to receive and treat the thrus and light weight overs, and the other the heavy weight overs together with certain fractions of said thrus and said light overs when communication is established between the two said sections, conveyor means extending between said transverse-diameter-dividing assembly and said one section to convey said thrus to said section, further conveyor means extending between said weight-dividing assembly and said one section to carry said light weight overs to said section, and further conveyor means extending between said weight-dividing assembly to said other section to convey said heavy weight overs to said section, said last mentioned section being divided into a plurality of intercommunicating sub-sections, said sections being in horizontal alignment and all containing a plurality of vertically disposed, spaced and pocketed pickup discs, those of said first section containing the smallest pockets, the sets of discs in each of said sub-sections each containing progressively larger pockets, an apertured wall separating said sections, a door covering said aperture but being movable to permit communication between said sections, an openable and closable discharge duct connected to said first mentioned section, said duct being located in said wall, inclined discharge troughs between said plates, and a main discharge chute adjacent each of said two main sections.

References Cited in the file of this patent

UNITED STATES PATENTS

| | | |
|---|---|---|
| 296,309 | Bowen | Apr. 8, 1884 |
| 892,825 | Goss | July 7, 1908 |
| 909,358 | Asplund | Jan. 12, 1909 |
| 1,600,037 | Bullard | Sept. 14, 1926 |
| 1,799,751 | Johnson | Apr. 7, 1931 |
| 1,809,701 | Hoefling et al. | June 9, 1931 |
| 2,047,508 | Ingraham | July 14, 1936 |
| 2,080,890 | Ingraham et al. | May 18, 1937 |
| 2,407,653 | Dempsey | Sept. 17, 1946 |

FOREIGN PATENTS

| | | |
|---|---|---|
| 12,318 | Norway | Nov. 2, 1903 |
| 471,121 | Canada | Jan. 30, 1951 |